April 23, 1968 S. B. GRAY 3,379,826

VIDEO PROCESSING SYSTEM PROVIDING CORRECTION FOR CHANGES IN THE LIGHT SOURCE INTENSITY AND FOR LIGHT FLUCTUATIONS DUE TO DIFFERENT PAGE REFLECTIVITIES

Filed May 5, 1965

*INVENTOR*
STEPHEN B. GRAY

*BY* Stanley M. Schurgin

*ATTORNEY*

United States Patent Office 3,379,826
Patented Apr. 23, 1968

3,379,826

VIDEO PROCESSING SYSTEM PROVIDING CORRECTION FOR CHANGES IN THE LIGHT SOURCE INTENSITY AND FOR LIGHT FLUCTUATIONS DUE TO DIFFERENT PAGE REFLECTIVITIES

Stephen B. Gray, Newton, Mass., assignor to Sylvania Electric Products Inc., a corporation of Delaware
Filed May 5, 1965, Ser. No. 453,414
4 Claims. (Cl. 178—6)

Figures 1, 2:
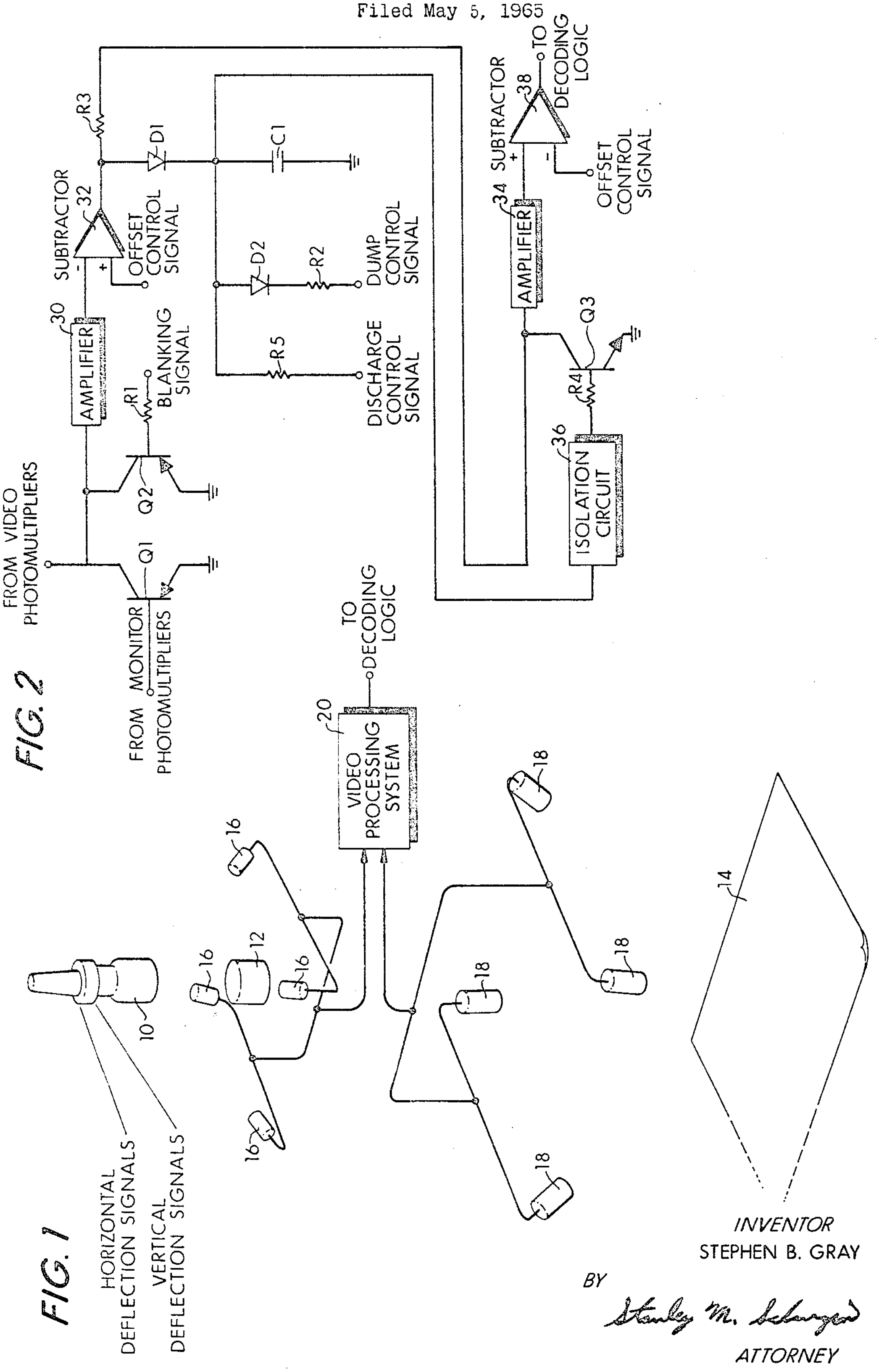

This invention relates to video processing systems and more particularly to systems for providing a controllable black-white threshold especially useful in character recognition equipment.

In electro-optical character recognition systems, the copy to be identified is scanned electro-optically, such as by a flying spot scanner, to produce signals whose intensity is proportional to the amount of light received from reflections of the light spot from the copy. The intensity of the signal will vary at any given instant between one of two levels, depending whether or not a character is being scanned at that particular instant. When no character is being scanned, a greater signal, which is termed the white signal, is produced since more light is reflected from the plain page than is reflected from a darkened character. In like manner, a lesser signal, termed the black signal, is produced when a character is being scanned since less light is reflected from the dark area of the printed character. To institute the recognition process, it is necessary to provide a threshold level above which a signal is recognized as a no-character indication, while a signal below this threshold is recognized as a character indication. In other words, it is necessary to discriminate between the black level and the white level. It is exceedingly difficult in practice to perform discrimination between the black and white levels since they vary due to several causes. Variation in the black level is caused by changes in the darkness of the printing which defines the character to be identified. It has been found, however, that such black level variation is not burdensome to proper system operation as long as the white level variation can be controlled.

Variation of the white level is caused generally by changes in the light source and scanner, and also by light fluctuations due to the page being read. Light output from the cathode ray tube employed in the flying spot scanner changes randomly due to cathode and phosphor aging, and drift in the grid bias voltage. In addition, light output from the cathode ray tube is a function of spot position, and the phosphor has varying brightness due to its history of scan patterns. For example, the brightness of the phosphor becomes degraded in an area which has been "burned in." The light output of the phosphor also varies because of non-uniformity of coating, and is also affected by distortion in the unblanking waveform.

Variations in the white level due to the page are caused by different page reflectivities depending upon the tint and surface texture of the particular paper, and also upon signal variation being a function of spot position on the page depending upon the specularity or diffuseness of the page at that place. In addition, lens transmission is a function of axis-to-ray angle, causing weaker light intensity at the extremities of a scan. A further disturbance is caused by gain variation of the photodetectors used to detect light reflected from the page, probably caused by time varying characteristics of the photo emissive surface with light intensity, duration and duty cycle. The effect of all these spurious variations is to modulate the desired video signal with a pair of noise signals, one due to the light source and the other due to the page.

It is, therefore, an object of the present invention to provide a video signal processing system in which unwanted signal variations are eliminated. Another object of the invention is to provide white level compensation in a character recognition system.

In accordance with the present invention, a first video signal, which is the desired signal modulated by unwanted signals caused by light source variation and page variation, is produced in response to light reflected from the page being read, and a second video signal, which is representative of unwanted variations in the light source, is produced from light emitted by the cathode ray tube of the scanner. The first video signal is divided by the second video signal to produce a signal in which light source variations are eliminated. This partially corrected signal is further corrected by dividing it with a peak detected version of the white level to eliminate variations due to the page.

The invention will be more fully understood from the following detailed description, taken in conjunction with the accompanying drawings, in which:

FIG. 1 is a diagrammatic representation of an electro-optical scanner with which the present invention is utilized; and FIG. 2 is a schematic diagram of a video signal processing system embodying the invention.

To understand the operation of the present invention, it will be helpful initially to consider a page reading system and flying spot scanner with which the invention is employed. The electro-optical scanner portion of a page reading system is illustrated in FIG. 1 and includes a cathode ray tube 10 and lens system 12 disposed over the copy 14 which is to be scanned. Four monitor photomultiplier tubes 16 are equally spaced below the face of the cathode ray tube in position to sense the intensity of light emitted by the phosphor screen. Four video photomultiplier tubes 18 are spaced around the copy 14 in position to sense light reflected from the page. The outputs of the monitor photomultiplier tubes are connected to a video processing system 20, as are the outputs of the video photomultiplier tubes.

In operation, a light spot from cathode ray tube 10 is focused by lens system 12 on the copy 14 and is caused to scan the copy under the direction of the deflection signals applied to the deflection coils. As the spot scans the page, light is reflected from the page and is received by the video photomultiplier tubes which provide an indication of characters being scanned. When a plain white page is being scanned, the reflected light received by the video photomultiplier tubes is greater than light reflected from a dark character printed on the page. Thus, the presence or absence of a character on the page can be detected by observing the intensity of the signal from the video photomultiplier tubes. Actually, two modes of scanning are employed, one to identify a line of characters, and another to identify the particular characters comprising the line. To identify a line of characters, the spot is scanned across the page and light reflected from the page provides an indication of the presence of a line of type. Once a line is found, the second scan mode is activated to vertically scan individual characters, and light reflected during this scan mode is processed to identify the character being scanned. Ideally a signal of a given higher value will be received when no character is being scanned, while a signal of a given lower value will be received when a character is being scanned. In practice, however, the signal levels received from light reflected from the printed page vary considerably for reasons which were mentioned hereinbefore and are deleterious to subsequent logic circuitry which must decode the received signals to determine the content of the page being scanned.

As discussed hereinbefore, variations in the signal received from the copy, and hence modulation of the desired signal, are caused, in general, by two things, variation in the light source and variation due to the page being read. The monitor photomultiplier tubes are in a position to sense the light intensity emanating from the cathode ray tube face, and their output signals will, therefore, be an indication of the intensity of the light source. Variations in the intensity of the light source will also be received by the video photomultiplier tubes when the light is reflected from the page being scanned.

The intensity of the signal from the video photomultiplier tubes is indicative of the presence or absence of a character, but this information is being modulated by the variations due to the light source and also due to the page. Elimination of intensity variations due to the light source can be accomplished by dividing the video photomultiplier signals, which contain signal times light source noise, by the monitor photomultiplier signals, which contain only noise.

Variations in the page, however, such as the tint of the paper, will be sensed only by the video photomultiplier tubes since light reflected from the page is received only by these tubes. This variation is eliminated, according to the invention, by peak detecting the video signal produced by the reflected light and using this peak detected signal to normalize the actual video signal. During the vertical scanning of a particular character, the sweep always starts at a white region of the page between lines of printing, and a peak detected video signal will be representative of the maximum white region for that sweep. The peak detected signal is divided into the actual video signal to provide correction of variations caused by page differences in the region under scan. Page variations along the horizontal scan of an entire line are corrected similarly, except that a peak detected reference signal is employed which follows the variation in white level, or, in other words, an average white level is used as a reference. Since during the long scan, it is only necessary to identify the presence of a line of printing, the gain adjustment problem is not so critical as during fine sweep of a single character and the average peak detected signal provides a suitable reference. If a true peak signal were employed during this long sweep, the adjusted gain could often be too low due to a white region which would give a deceptively high peak signal for that scan. The video signal thus corrected is free of variations caused by both source and page variations, and is then applied to the decoding logic for interpretation of the characters being scanned.

The implementation of the video processing system 20 is shown in FIG. 2. Signals from the video photomultipliers 18 are applied to the collector of transistor Q1, while signals from the monitor photomultipliers are applied to the base. Transistor Q1 is operated in its saturation region and comprises a single element division circuit whose output voltage is proportional to the quotient of the collector current and the base current. This simple but highly effective division circuit is described in copending application S.N. 453,402, filed May 5, 1965. In brief, this division circuit comprises a transistor stage whose collector characteristics are substantially linear in the saturation region and the collector and base currents of which are of a magnitude sufficient to operate the transistor in saturation. It has been found that the collector-emitter voltage in the saturation region is proportional to the quotient of collector current and base current; thus division is achieved.

It will be recalled that the video photomultipliers produce a signal which contains the character information modulated by the intensity variations due to the light source. The signal from the monitor photomultipliers is representative of the light source variations only. Thus, the light source variations are removed by dividing the video photomultiplier and monitor photomultiplier signals. This division is achieved by transistor Q1 whose output voltage is proportional to the quotient of collector current and base current, as described above. The output signal from transistor Q1 is therefore a video signal whose variations due to the light source have been removed. A blanking signal from a suitable source is applied via resistor R1 and transistor Q2 to the collector of transistor Q1 to ground the partially corrected video during retrace so that extraneous noise will not be introduced into the system. The output signal is amplified by amplifier 30 the output of which is applied to the negative input of an operational amplifier functioning as a subtraction circuit. An offset control signal is applied to the positive input of subtractor 32 to correct for the offset introduced by the division circuit and to adjust the operating level. The output of operational amplifier 32 is the partially corrected video signal having a direct current offset, determined by the magnitude of the offset control signal, adjusted so that the black level is at zero volts. This video signal is applied via a resistor R3 to an amplifier 34 and also to the collector of transistor Q3, and is peak detected by diode D1 and capacitor C1 which are serially connected between the output of subtractor 32 and ground. The peak white signal is stored in the form of a charge on capacitor C1 and is applied via an isolation circuit 36 and resistor R4 to the base of transistor Q3 which forms the second divider circuit of the correction system. Isolation circuit 36 is a network offering a high impedance to capacitor C1 to prevent discharge. The output of transistor Q3 is the quotient of the signals applied to its collector and base and is applied via an amplifier 34 to the positive input of an operational amplifier 38 which also operates as a subtractor. A suitable offset control signal is appiled to the negative input terminal of this subtractor to adjust the operating level of the video signals. During the long scan to find a line of printing, a discharge control signal is applied via a resistor R5 to capacitor C1 to discharge it at a predetermined rate. The effect of this discharge is to cause the charge on the capacitor, and hence the peak detected signal, to follow the negative going variations in the white level for that scan. A reference signal which follows the peak white level for that scan is, therefore, available to correct the white level during long scan. This discharge signal is not used during fine scan since true peak detection is then desired. A dump control consisting of serially connected diode D2 and resistor R2 discharges capacitor C1 after each sweep by applying a suitable dump control signal to capacitor C1 to discharge it sufficiently so that it can be recharged to a new peak level during the next sweep. The output of subtractor 38 is then a fully corrected video signal which can be applied to appropriate threshold circuits to control the decoding logic used in deciphering the content of the scanned page.

From the foregoing, it is evident that a relatively simple and effective video processing system has been provided which is especially useful to eliminate white level variation in an electro-optical character recognition system. Light source variations are removed by dividing the video signal by a reference signal representative of these variations, and page variations are eliminated by dividing the partially corrected signal with a peak detected version of the white level. The resulting signal is then free of all spurious variations caused by the light source and the page being scanned. While a particular embodiment of the invention has been shown and described, it is not intended to thereby limit the scope of the invention except as indicated in the appended claims.

What is claimed is:

1. In an electro-optical character recognition system including a flying spot scanner, at least one first photodetector operative to produce a first signal in response to light received by reflection from a page being scanned, and at least one second photodetector operative to produce a second signal in response to light received from said scanner, a video processing system for eliminating unwanted variations in the level of said first signal comprising, means for dividing said first signal by said second signal to produce a partially corrected signal, means for peak detecting said partially corrected signal, and means for dividing said partially corrected signal by said peak detected signal.

2. In an electro-optical character recognition system including a flying spot scanner, at least one first photodetector operative to produce a first signal in response to light received by reflection from a page being scanned, and at least one second photodetector operative to produce a second signal in response to light received from said scanner, a video processing system for eliminating unwanted amplitude variations in said first signal comprising, a first divider circuit operative in response to said first signal and said second signal to produce a partially corrected signal, a peak detector operative in response to said partially detected signal to produce a peak detected version of said first signal, and a second divider circuit operative in response to said peak detected signal and said partially corrected signal to produce a corrected version of said first signal.

3. In an electro-optical character recognition system including a flying spot scanner, at least one video photodetector operative to produce a first signal in response to light received by reflection from a page being scanned, said first signal having amplitude variations caused by changes in intensity of the reflected light, and at least one monitor photodetector operative to produce a second signal in response to light received directly from said scanner, said second signal having amplitude variations caused by changes in intensity of the light from said scanner, a video processing system for eliminating the unwanted amplitude variations in said first signal comprising, a first divider operative in response to said first signal and said second signal to produce a third signal having no amplitude variations caused by changes in intensity of light from the scanner, a peak detector operative in response to said first signal to produce a peak detected version thereof, and a second divider operative in response to said peak detected signal and said first signal to produce an output signal having no amplitude variations caused by changes in intensity of light reflected from the page.

4. In an electro-optical character recognition system including a flying spot scanner, at least one video photodetector operative to produce a first signal in response to light received by reflection from a page being scanned, said first signal having amplitude variations caused by changes in intensity of the reflected light, and at least one monitor photodetector operative to produce a second signal in response to light received directly from said scanner, said second signal having amplitude variations caused by changes in intensity of the light from said scanner, a video processing system for eliminating the amplitude variations in said first signal caused by changes in intensity of the light from said scanner comprising, a first transistor biased in saturation and having its collector connected to said first signals, its base connected to said second signals and its emitter connected to ground, the collector of said first transistor being also connected to the input of amplifying means, a diode serially connected with a capacitor in the order named between the output of said amplifying means and ground, the anode of said diode being also connected through a resistor to the collector of a second transistor, the common connection of said diode and capacitor being connected through an isolation circuit and a resistor to the base of said second transistor, the collector of said second transistor being connected to the input of amplifying means the output of which is the corrected signal.

References Cited

UNITED STATES PATENTS

| | | | |
|---|---|---|---|
| 2,804,550 | 8/1957 | Artzt | 178—7.2 |
| 3,274,335 | 9/1966 | Gray | 178—7.1 |
| 3,322,893 | 5/1967 | Townsend | 178—7.1 |

ROBERT L. GRIFFIN, *Primary Examiner.*

J. A. ORSINO, *Assistant Examiner.*